Jan. 31, 1961
W. J. OBENBERGER ET AL
2,970,252
CURRENT REGULATOR WITH SATURABLE CORE
Filed June 17, 1955
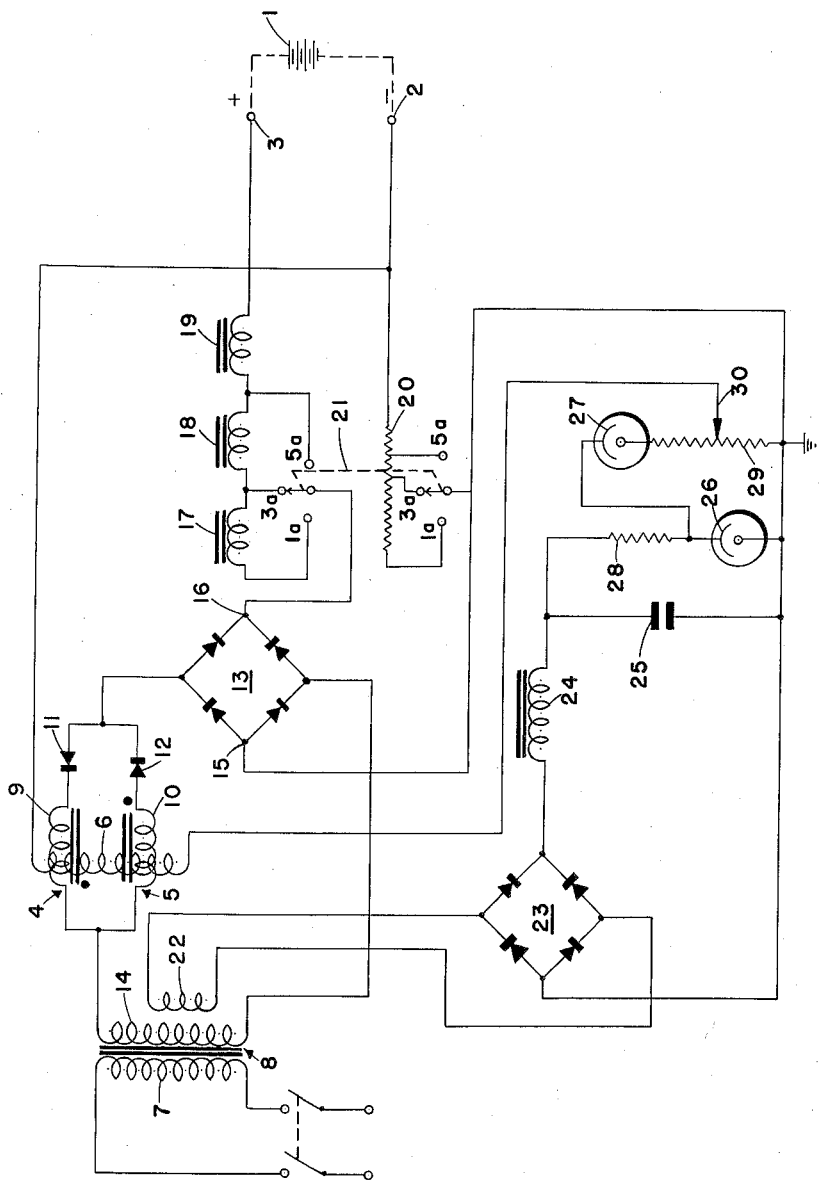
INVENTORS.
WALLACE J. OBENBERGER
CHARLES E. BURGI
BY
*William R. Lerry*
ATTORNEY United States Patent Office 2,970,252
Patented Jan. 31, 1961

2,970,252

CURRENT REGULATOR WITH SATURABLE CORE

Wallace J. Obenberger, Lakewood, and Charles E. Burgi, Long Beach, Calif., assignors to North American Aviation, Inc.

Filed June 17, 1955, Ser. No. 516,184

4 Claims. (Cl. 321—18)

This invention relates to current regulators and particularly to a current regulator which utilizes self-saturating magnetic amplifiers.

It is frequently desirable, particularly for use as a battery charger, to supply a constant D.-C. current to a load of variable effective impedance. To satisfy this requirement and still use a substantially constant voltage source, it is desirable to utilize a component whose output power is a variable ratio of the input power. Direct current saturable reactors having self-magnetization are often provided between a source of power and a load and are used to change the ratio between the output and input power. When the source of power generates an A.-C. voltage, the self-saturating reactor is generally of the unidirectional type with unidirectional valves or rectifiers connected in series with the reactor winding elements. A control winding or saturating winding is utilized to vary the amount of power required to produce saturation of the core of the reactor. By varying the magnitude of the time-current integral required for the core to reach saturation, the output power to a load connected in series with the reactor is varied over wide ranges. The magnitude of this time-current integral is varied by passing a direct current of adjustable magnitude through the control or saturating winding wound on the core of the reactor. This characteristic of self-saturating reactors to provide a variable power output, the magnitude of which is dependent upon the amount of current flowing in the control winding of the saturable reactor, can be utilized to vary the potential applied to a series of batteries to be charged.

It is therefore an object of this invention to provide an improved current regulator utilizing self-saturating reactors.

It is another object of this invention to provide a current regulator utilizing self-saturating reactors in which the control winding of said reactor is subjected to the differential voltage between a reference voltage of predetermined magnitude and the voltage drop across an impedance of preselected magnitude connected in series with the load.

It is a further object of this invention to provide a current regulating device for supplying direct current of predetermined magnitude to a load of variable effective impedance utilizing a self-saturating reactor connected between a source of power and the load, a resistor of known magnitude connected in series with the load, a source of reference voltage and means subjecting the control winding of said saturable reactor to the voltage differential between said reference voltage and the voltage drop across said series resistor.

Other objects of invention will become apparent from the following description taken in connection with the accompanying drawing, in which is a schematic drawing of a preferred embodiment of this invention.

Referring now to the drawing, load 1 is connected across terminals 2 and 3. The current through load 1 is to be maintained constant at some preselected value. If the load has a variable effective impedance, such as the bank of batteries shown as being recharged, some means must be provided to vary the power supplied to terminals 2 and 3. The effective impedance of a load is defined as the voltage applied to the terminals of the load divided by the current flowing in the load as a result of that impressed voltage. As is well-known, the effective impedance of the batteries as they are being recharged varies over wide ranges due to the gradual increase in the terminal voltage of the batteries. The voltage applied to terminals 2 and 3 must equal this battery terminal voltage plus an additional potential required to continuously maintain a constant recharging current to flow through the batteries. This battery terminal voltage may vary from 18 to 45 volts. For optimum recharging of the batteries, it is preferable to maintain the charging rate, i.e., the current flowing through the batteries, at a constant preselected value.

The current regulator contemplated by this invention and shown schematically in the drawing accomplishes this constant charging rate by utilizing a pair of self-saturating magnetic reactors 4 and 5, the control winding 6 of which is subjected to a potential which is dependent upon the current flowing through the load. As will be more fully described later, control winding 6 is subjected to a voltage differential between a reference voltage and the voltage drop across a series resistor. This results in much better current regulation than would be obtained by merely connecting the control winding in parallel with a series resistor, since a small change in the load current can be made to result in a comparatively large change in control current in winding 6.

A source (not shown) of substantially constant A.-C. voltage is supplied to primary winding 7 of input transformer 8. Load windings 9 and 10 of saturable reactors 4 and 5 are connected in series with rectifiers 11 and 12, respectively. The two load winding-rectifier networks are connected in parallel with the polarity of the rectifier units in opposite directions. The parallel saturable reactor network is connected in series with full-wave bridge rectifier 13 across secondary winding 14 of transformer 8.

Load terminals 15 and 16 of full-wave bridge rectifier 13 are connected through one or more of a plurality of inductors, 17, 18 and 19, and adjustable resistor 20 to load terminals 2 and 3. Double-pole, triple-throw switch 21 is provided to vary the amount of inductance and resistance in series with the load. As will be more fully described later, the magnitude of the resistance of resistor 20 determines the magnitude of the basic charging rate that is desired. Here it suffices to state that the current regulator of this invention operates to maintain the voltage drop across resistor 20 at some predetermined value. Therefore, a change in the value of the resistance, R, of resistor 20 must be accompanied by a corresponding change in the magnitude of the current, I, flowing through the resistor in accordance with the equation $IR=$ a constant. Thus, in order to obtain the three indicated ratios of charging currents, resistor 20, which may be considered to have a total resistance of 15 ohmic units, is provided with taps connected to the contacts of switch 21 at the 3 and 5 ohmic units points. Inductors 17, 18 and 19 serve as filters to eliminate ripple A.-C. in the load circuit.

The D.-C. reference voltage which is to be compared to the voltage drop across series resistor 20 is supplied by secondary winding 22, full-wave bridge rectifier 23, filter choke 24, filter capacitor 25, and a pair of voltage regulator tubes 26 and 27. The voltage across filter capacitor 25 still has a considerable A.-C. ripple. Therefore, voltage regulator tube 26 is connected in series with resistor 28 across filter capacitor 25 to furnish a substantially stable D.-C. voltage across the regulator tube. The stability of the reference voltage is still further improved by utilizing a second regulator tube 27 in series with potentiometer 29 connected across regulator tube 26. The potential picked off by wiper 30 of potentiometer 29 is therefore a highly stable D.-C. potential of a preselected magnitude.

It is to be noted that one end of potentiometer 29 and one end of series resistor 20 are connected together and, in this case, grounded. Control winding 6 of saturable reactors 4 and 5 is connected between wiper 30 and the other end of series resistor 20. Therefore, control winding 6 is subjected to the algebraic voltage difference between the reference voltage of wiper 30 and the voltage drop across series resistor 20.

In operation, transformer 8 supplies an A.-C. voltage of preselected magnitude to the series saturable reactor-rectifier circuit. As this A.-C. voltage is increasing in an assumed positive direction, initially, substantially all of the voltage drop, of the circuit attached across secondary winding 14, is impressed across load winding 9 of saturable reactor 4. At some preselected time interval after the voltage has passed through zero, the core of saturable reactor 4 becomes saturated. At this time, since only the slight D.-C. resistance of winding 9 opposes the flow of the current, most of the voltage of secondary winding 14 of transformer 8 is impressed across bridge rectifier 13, or more specifically across load terminals 15 and 16 of rectifier 13. Similarly, as the voltage output of secondary winding 14 of transformer 8 is increasing in an assumed negative direction, initially, most of the output voltage from the transformer is impressed across load winding 10 of saturable reactor 5. At some preselected time, the core of saturable reactor 5 becomes saturated. At this time, the predominant portion of the output voltage of winding 14 is impressed across terminals 15 and 16 of bridge rectifier 13. The voltage appearing at output terminals 15 and 16 of bridge rectifier 13 is therefore a pulsating D.-C. voltage, which has a comparatively high magnitude during a preselected portion of each half wave of input. Inductors 17, 18 and 19 are utilized to effectively integrate this pulsating D.-C. voltage and apply to terminals 2 and 3 a substantially smooth D.-C. voltage, the magnitude of which is a predetermined function of the integral of the output voltage of rectifier 13. The current flowing through inductors 17, 18 and 19 and series resistor 20 as a result of the output voltage of rectifier 13 depends not only upon the voltage output of rectifier 13 but also upon the effective impedance of the load connected across terminals 2 and 3. Since it is desired that a constant current of preselected magnitude be supplied to this load, the circuit provides a means for varying the output voltage of rectifier 13 in a manner to maintain constant the current flowing through the load.

The time interval before saturating of reactors 4 and 5 after the beginning of any particular half cycle of input from secondary winding 14 is dependent on the initial status of the flux in the cores of reactors 4 and 5. This status is in turn dependent on the magnitude of the direct current flowing through control winding 6. The theory behind saturable reactors is well-known to those skilled in the art and need not be further described here. It is sufficient to state that the time of saturation of reactors 4 and 5 is adjusted by varying the amount of direct current flowing in control winding 6. The current flowing in control winding 6 is of course determined by the potential applied to the end terminals of winding 6.

As has been previously pointed out, one end of winding 6 is connected to a constant reference potential, while the other end of winding 6 is connected to one end of series resistor 20. Thus, the potential applied to winding 6 is determined by the voltage drop across resistor 20 as compared with the reference voltage picked off by wiper 30 of potentiometer 29.

Assume that a condition of equilibrium has been established in which the current flowing through resistor 20 and load 1 is of the desire magnitude. If now, due to a recharge of the cells of the batteries, the terminal voltage of the batteries of load 1 increases, there results an increase in the effective impedance of load 1. This results in a decrease in the current flowing through resistor 20 and load 1. The upper end of winding 6 is now connected to a lower potential than its previous value. This results in a decrease in the saturation current flowing through winding 6, thereby resulting in both saturable reactors 4 and 5 becoming saturated at an earlier time than previously. Since the time of saturation is earlier, the integral of the voltage output of rectifier 13 is increased. This increased voltage output from rectifier 13 results in a corresponding increase in the current flowing through load 1 and resistor 20.

It is therefore readily apparent that the increase in effective impedance of the load attached to terminals 2 and 3 does not result in any substantial change in the current flowing through the load. By connecting control winding 6 between a reference voltage which is selected as substantially equivalent to and slightly less than the desired voltage to be maintained across series resistor 20, a slight change in this voltage results in a large change in the rate of flow of current in winding 6 and in the time of saturation of saturable reactors 4 and 5. Thus, whereas, if winding 6 were connected merely in parallel with resistor 20, there would be only a slight change in the current in winding 6 in response to a slight change in the voltage across resistor 20, the circuit shown in the drawing accomplishes a large change in current in winding 6 in response to the same slight change in the voltage across resistor 20.

Although the invention has been described and illustrated in detail, it is to be clearly understood that the same is by way of illustration and example only and is not to be taken by way of limitation, the spirit and scope of this invention being limited only by the terms of the appended claims.

We claim:

1. A current regulating device comprising a source of A.C. potential; a pair of self-saturating reactors, each of said reactors having a load winding and a control winding with a rectifier connected in series with said load winding, the load winding-rectifier series connections of said saturable reactors being connected in parallel with the polarity of said rectifiers in opposite directions; a full-wave bridge rectifier network having a pair of D.C. output terminals and connected in series with said parallel reactor network across said source of A.C. potential; a filter network; a resistor; a pair of load terminals; means connecting said filter, resistor and load terminals in series across said output terminals of said bridge network; a source of D.C. reference voltage; means connecting said D.C. reference voltage source and said control winding in series with said resistor and means subjecting the control windings of said saturable reactors to the voltage differential between said reference voltage and the voltage drop across said resistor.

2. A current regulator for regulating the current supplied to a load comprising a source of A.C. potential, a pair of self-saturating reactors having rectifier units connected in series with each reactor winding elements for self-magnetization, said reactor winding elements being connected in parallel with the polarity of said rectifier units in opposite directions; a full-wave rectifier having D.C. output terminals, said full-wave rectifier being connected in series with said parallel reactor network across said source of A.C. potential; filter means connected to filter the output voltage across said output terminals of said full-wave rectifier; a resistive element connected to be in series with said load and subjected to the output of said filter means; a source of D.C. reference voltage and means subjecting at least one direct current saturating winding of said reactors to the voltage differential between said reference voltage and the voltage drop across said resistor.

3. In combination, a bridge rectifier having a pair of input terminals, one of said input terminals connected to receive voltage supplied by an A.C. source, said bridge rectifier having a pair of output terminals connected across a load, a unidirectional self-saturating reactor having a pair of load windings connected in parallel between the other of said input terminals of said bridge rectifier and the other side of said A.C. source and having a control winding, a resistor having one end connected to one of said output terminals and the other end connected to one side of said load, a source of D.C. reference voltage, and means for connecting said source of reference voltage and said control winding in series across the ends of said resistor.

4. A current regulator comprising a pair of input terminals connected to be responsive to an A.C. source, a pair of output terminals connected across a load, bridge rectifier means having its input connected to be responsive to said input terminals and its output connected to provide direct current to said output terminals, means for regulating the flow of current across said load comprising a unidirectional self-saturating reactor having a pair of load windings connected in parallel between one of said input terminals and the input of said bridge rectifier and having a control winding, a source of D.C. reference voltage, a resistor, means for providing a first current path comprising one side of said D.C. reference voltage, said control winding, one of said output terminals, said resistor, and the other side of said D.C. reference voltage, and means for providing a second current path comprising the output of said bridge rectifier, said resistor, and said one output terminal.

References Cited in the file of this patent

UNITED STATES PATENTS

| | | |
|---|---|---|
| 2,018,348 | Dijksterhuis | Oct. 22, 1935 |
| 2,079,500 | Foos | May 5, 1937 |
| 2,504,675 | Forssell | Apr. 18, 1950 |
| 2,509,380 | Walker | May 30, 1950 |
| 2,596,685 | Hedstrom | May 13, 1952 |
| 2,611,889 | Huge | Sept. 23, 1952 |
| 2,723,372 | Eagan et al. | Nov. 8, 1955 |
| 2,733,402 | Bixby | Jan. 31, 1956 |